US011381786B2

(12) United States Patent
Robinson, Jr.

(10) Patent No.: US 11,381,786 B2
(45) Date of Patent: Jul. 5, 2022

(54) SYSTEMS AND METHODS FOR CAPTURING IMAGES AND VIDEO

(71) Applicant: Curtis Ray Robinson, Jr., Rochester, NY (US)

(72) Inventor: Curtis Ray Robinson, Jr., Rochester, NY (US)

( * ) Notice: Subject to any disclaimer, the term of this patent is extended or adjusted under 35 U.S.C. 154(b) by 0 days.

(21) Appl. No.: 16/689,925

(22) Filed: Nov. 20, 2019

(65) Prior Publication Data

US 2020/0169703 A1 May 28, 2020

Related U.S. Application Data

(60) Provisional application No. 62/770,990, filed on Nov. 23, 2018.

(51) Int. Cl.
*H04N 5/232* (2006.01)
*H04N 7/18* (2006.01)
*G06F 9/451* (2018.01)
*G06F 21/88* (2013.01)
*G06F 3/041* (2006.01)

(52) U.S. Cl.
CPC ............. *H04N 7/188* (2013.01); *G06F 9/451* (2018.02); *G06F 21/88* (2013.01); *H04N 5/23203* (2013.01); *H04N 5/232935* (2018.08); *H04N 7/183* (2013.01); *G06F 3/041* (2013.01)

(58) Field of Classification Search
None
See application file for complete search history.

(56) References Cited

U.S. PATENT DOCUMENTS

| 8,854,491 | B2 * | 10/2014 | Ford ................. H04N 5/23219 348/211.3 |
| 9,066,019 | B2 * | 6/2015 | Weatherford .......... H04N 5/341 |
| 10,146,560 | B2 * | 12/2018 | Wu .......................... H04W 4/60 |
| 10,291,321 | B2 * | 5/2019 | Ganick ................... G06Q 30/02 |
| 10,496,802 | B2 * | 12/2019 | Weis ........................ G06F 21/31 |
| 10,650,134 | B2 * | 5/2020 | Schiller ................... G06F 21/40 |
| 2012/0281080 | A1 * | 11/2012 | Wang ................... G06F 3/04883 348/77 |
| 2018/0027019 | A1 * | 1/2018 | Ligman ................... H04L 63/20 726/1 |
| 2019/0179482 | A1 * | 6/2019 | Ghosh ................. G06F 11/3476 |
| 2020/0162895 | A1 * | 5/2020 | Chakra ............... H04W 12/003 |

FOREIGN PATENT DOCUMENTS

CN 108259823 A * 7/2018

OTHER PUBLICATIONS

Android API for camera package, using wayback machine to find a version pre-dating Nov. 23, 2018 (Year: 2018).*

(Continued)

*Primary Examiner* — Shadan E Haghani
(74) *Attorney, Agent, or Firm* — Cognition IP, P.C.; Saleh Kaihani (57) ABSTRACT

Disclosed are methods and systems for a security camera. In one embodiment, a mobile application is disclosed that generates a transparent camera activity with a camera preview undetectable by human eye. The camera activity can run on top of other applications of a mobile computing device and capture images and/or video of an unauthorized user without being detected.

20 Claims, 9 Drawing Sheets

(56) References Cited

OTHER PUBLICATIONS

Android API for camera2 package, using wayback machine to find a version pre-dating Nov. 23, 2018 (Year: 2018).*
Most popular operating systems for smart phones (Year: 2017).*
Transparent Activity on Android—Stack overflow (Year: 2017).*
Android Developer Guide—Camera API (Year: 2018).*
Android Developer Guide—android.hardware.camera2 reference (Year: 2018).*

* cited by examiner

SYSTEMS AND METHODS FOR CAPTURING IMAGES AND VIDEO

CROSS-REFERENCE TO RELATED APPLICATIONS

This application claims the benefit of priority of U.S. Provisional Application No. 62/770,990 filed on Nov. 23, 2018 entitled "SYSTEMS AND METHODS FOR CAPTURING IMAGES AND VIDEO," which is hereby incorporated by reference in its entirety and should be considered a part of this specification.

BACKGROUND

Field of the Invention

This invention relates generally to methods and systems for software applications, and in particular, mobile applications or computer programs, capable of capturing images and recording video.

Description of the Related Art

Security mobile applications which can capture images of an unauthorized user, exist, but have limitations. For example, they cannot function as a foreground application and while other applications are running and still be undetectable. Therefore, their security and monitoring functionality can be compromised. Furthermore, modern computing devices are increasingly critical devices for businesses and individuals, where sensitive or private data is stored. Consequently, there is a need for improved security programs that can protect these devices from unauthorized use or aide in their recovery, in case they are stolen.

SUMMARY

In one aspect a method of capturing media using a camera in a computing device is disclosed. The method includes: generating an Activity, wherein the Activity comprises one or more user interface elements, and wherein the Activity further comprises a layout file and the layout file generates a display of the user interface elements on a screen of the computing device; modifying styles in the layout file, such that the user interface elements are generated transparent on the screen; requesting access to the camera of the computing device and a preview image feed from the camera, wherein the preview image feed comprises preview images from the camera; generating a preview class comprising the preview images from the camera; generating a preview surface small enough in dimension to be invisible to human eye; outputting the preview images to the preview surface; incorporating the preview surface in the layout file, wherein the preview surface generates the preview images from the camera on the screen; generating a camera object; receiving a first trigger event; and based on parameters of the camera object, capturing one or more images or a video segment, in response to the first trigger event.

In one embodiment, the method further includes: terminating the Activity after the image and/or the video segment are captured or moving the Activity to background.

In some embodiments, the method further includes configuring the camera object settings, including one or more of an identifier of the camera, image and/or video quality, and a storage location for captured image and/or video.

In another embodiment, the screen includes a touch screen and the first trigger event comprises receiving an input comprising a user touching the touch screen.

In some embodiments, the layout file is in XML format.

In another embodiment, the preview surface comprises a square, a rectangle or circle.

In some embodiments, the camera object is generated using Camera API and the preview class comprises a SurfaceView object and implements SurfaceHolder.Callback.

In another embodiment, capturing video comprises generating a MediaRecorder object.

In one embodiment, the method further includes using services to continue recording video in the background.

In one embodiment, generating the Activity is in response to one or more of: occurrence of one or more predetermined conditions, detection of one or more predetermined background Activity, receiving a trigger from a broadcast receiver, detection of a predetermined application among running applications on the computing device, receiving a user interaction with a user interface of the computing device, and receiving a signal from a timer or alarm application.

In some embodiments, detection of a predetermined application comprises polling one or more of background logs, PackageManager, UsageStatsManager and ActivityManager.

In another embodiment, the camera object is generated using Camera API and the preview class comprises a SurfaceView object.

In one embodiment, the camera object is generated using Camera2 API, the preview class comprises a TextureSurface object, and the preview surface comprises a UI element.

In another embodiment, the method of Claim further includes capturing one or more screen shots of the screen of the computing device and storing the screen shots with an indicator comprising association with the captured images and/or video segment.

In another aspect, a non-transitory computer storage is disclosed. The storage stores executable program instructions that, when executed by one or more computing devices, configure the one or more computing devices to perform operations including: generating an Activity, wherein the Activity comprises one or more user interface elements, and wherein the Activity further comprises a layout file and the layout file generates a display of the user interface elements on a screen of the computing device; modifying styles in the layout file, such that the user interface elements are generated transparent on the screen; requesting access to the camera of the computing device and a preview image feed from the camera, wherein the preview image feed comprises preview images from the camera; generating a preview class comprising the preview images from the camera; generating a preview surface small enough in dimension to be invisible to human eye; outputting the preview images to the preview surface; incorporating the preview surface in the layout file, wherein the preview surface generates the preview images from the camera on the screen; generating a camera object; receiving a first trigger event; and based on parameters of the camera object, capturing one or more images or a video segment, in response to the first trigger event.

In one embodiment, the operations further include terminating the Activity after the image and/or the video segment are captured or moving the Activity to background.

In another embodiment, the camera object is generated using Camera API and the preview class comprises a SurfaceView object and implements SurfaceHolder.Callback.

In some embodiments, capturing video includes generating a MediaRecorder object.

In one embodiment, the operations further include using services to continue recording video in the background.

In another embodiment, the camera object is generated using Camera2 API, the preview class comprises a TextureSurface object, and the preview surface comprises a UI element.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

DEFINITIONS

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

When the terms "one", "a" or "an" are used in the disclosure, they mean "at least one" or "one or more", unless otherwise indicated.

The term "application," "mobile application," or "app" can refer to an application class of an operating system that contains sub-components, such as activities, services, broadcast receivers, and content providers.

The term "activity" can refer to a single screen with a user interface. In one respect, an "activity" can be an application component that provides a user with one or more user interface (UI) elements. In that sense, activity is an entry point into an app for the user of the app. In some operating systems, an activity can be a subclass of the activity class defined by an operating system.

The term "service" can refer to a program segment or an application component that runs in the background to perform long-running operations, with or without user interactions. A service can be implemented as a subclass of the Service class offered by an operating system.

The term "broadcast" can refer to an application and/or an operating system sending and/or receiving messages from the operating system when an event of interest occurs.

The term "broadcast receivers" can refer to application components that enable the applications to receive broadcast messages from the operating system and/or other applications.

The term "state" can be used to refer to an event, user-triggered or system-triggered, that can cause an activity to transition from one mode of operation to another.

"Style File" can include attributes and definitions that an Activity uses to generate the appearance of a view or display.

"System services" can refer to processes in an operating system that can connect low-level hardware functionality with high-level applications and software processes.

Modern computing devices, such as smart phones, desktop computers, laptop computers and tablet devices enjoy wide-spread use and popularity. Most modern computing devices include one or more camera devices capable of recording images and/or video. These cameras can be used to provide various security and monitoring functionality, related to the computing device, the users of the device, and/or the environment where these devices are located. Proposed systems and methods allow a first user of a computing device (e.g., an administrator) to enable the computing device to capture images and/or video recordings of a second user of the device (e.g., an unauthorized user of the device), without the second user's knowledge, and without being detected. Several embodiments are described with reference to mobile computing devices, such as mobile phones, by any computing device, having a camera can be used to implement the embodiments described herein.

In one embodiment, the disclosed systems and methods can be implemented in a mobile computing device using Android® (an operating system from Google®, Inc.) or similar operating systems and software tools available therein. Most such operating systems outline requirements for applications using the camera hardware functionality. For example, applications using the camera in some operating systems, including Android, need to be in the foreground when using the camera and must present a preview window to their users. When active and using the camera, these applications are not allowed to run in the background. These operating systems' security constraints, therefore, do not allow a camera application to run as a background process and record images of the user of the mobile computing device. The proposed security camera application is capable of running in the foreground as a top application and having a preview function to satisfy requirements of such operating systems, while being undetected by the user of the mobile computing device.

Figure 1A:
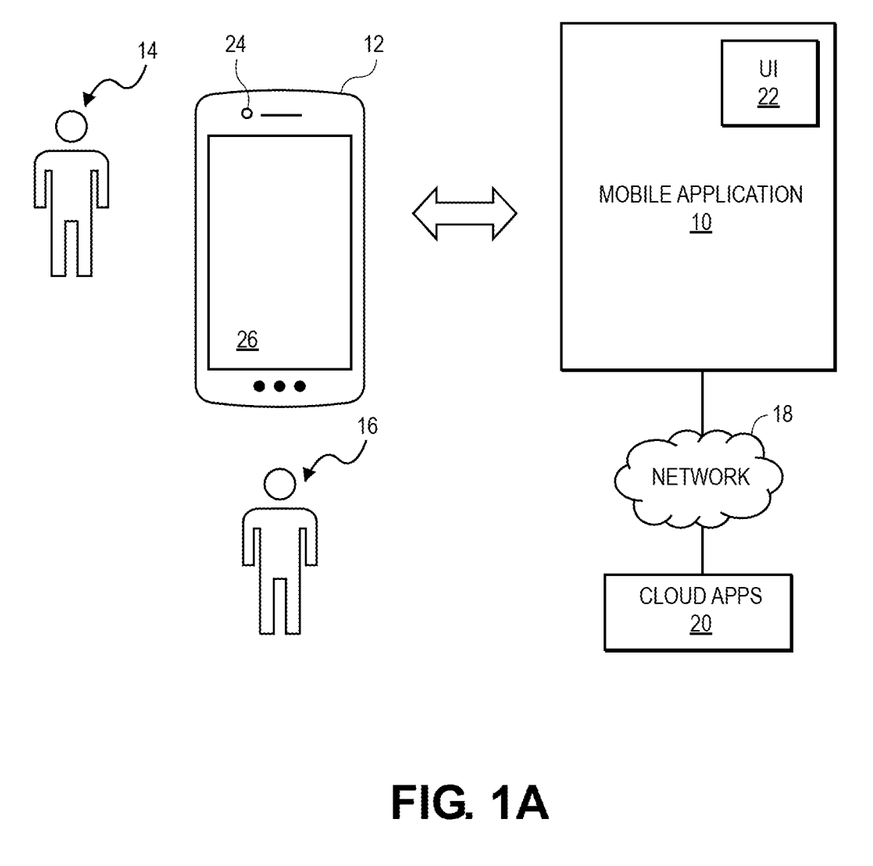
FIG. 1A is a diagram of an embodiment, where a mobile application can be configured to capture images and/or video recordings using a camera of a mobile computing device.

FIG. 1A is a diagram of an embodiment, where a mobile application 10 can be configured to capture images and/or video recordings using a camera of a mobile computing device 12. A first user 14 of the mobile computing device 12 can configure the mobile application 10 to capture images and/or video of a second user 16. Examples of the first user 14 can include an owner of the mobile computing device 12 and an administrator of the mobile computing device 12 in an IT department. Examples of the second user 16 can include an unauthorized user, such as a thief having taken possession and control of the mobile computing device 12, unlawfully.

The mobile application 10 can use the network 18 to communicate and/or transmit/receive data to one or more resources on the internet, such as cloud applications 20. Communication abilities of the mobile application 10 can be enabled via hardware and software of the mobile computing device 12. The network 18 can be any wired or wireless communication network, enabling the mobile computing device 12 and the mobile application 10 to connect with and communicate with resources on the web or the internet, such as cloud applications 20. The network 18 can include a Wi-Fi network, local area network, wide-area network, cellular phone network and others. The cloud apps 20 can include backend servers, online or remote resources of an IT department or other infrastructure for managing the operations of the mobile application 10.

The mobile application 10 can be implemented using the development tools available for the mobile computing device 12. For example, if mobile application 10 is implemented in an Android operating system, Android software development kits (SDKs) and Integrated Development Environment (IDE) can be used to build the functionality of the mobile application 10 as will be described. In some embodiments, the mobile application 10 can include a user interface (UI) 22 via which the first user 14 can communicate with the mobile application 10 and change its configuration and/or interact with its options. In some embodiments, the mobile application 10 can include a setup mode of operation where an administrator user 14 can interact with menus and options of the mobile application 10 via UI 22, in order to configure the mobile application 10. In other embodiments, the mobile application 10 can be remotely configured via network 18, without the need for UI 22. In another mode of operation, the security mode of operation, the mobile application 10 is undetected by a user of the mobile computing device 12, as will be described in the various embodiments below.

The mobile computing device 12 includes one or more cameras. Most contemporary mobile devices include one or more front-facing cameras, a camera that is on the same surface as the touch screen of the mobile computing device 12 and one or more rear facing cameras, typically embedded in the surface opposite the touch screen surface of the mobile computing device 12. The front facing camera 24 of the mobile computing device 12 is directed to and can capture images/video of a user who is in front of or is interacting with the touch screen 26 of the mobile computing device 12. The mobile application 10 can utilize the front facing camera 24 and/or a rear-facing camera and their associated software to capture images and/or videos of subjects in the field of view of the cameras of the mobile computing device 12.

Overview of a Security Camera Application

Figure 1B:
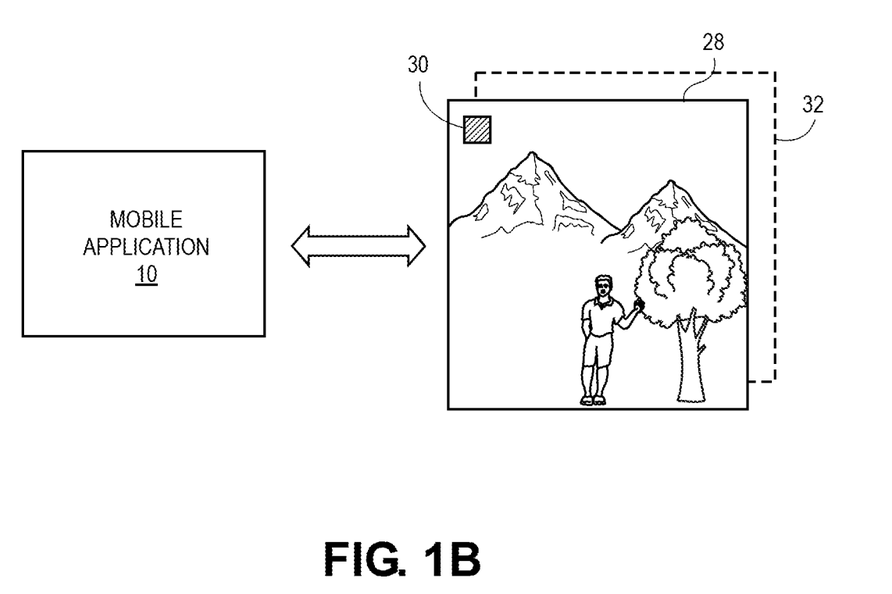
FIG. 1B illustrates a diagram of the operations of the mobile application of the embodiment of FIG. 1.

The mobile application 10 (a security camera application) can be built to generate an Activity with a transparent display 28 and a camera preview window 30, small enough to be undiscernible to human eye. When mobile application 10 runs as a foreground application, the user of the mobile computing device 12 looking at the touch screen 26 does not detect the transparent display 28, and instead sees the background application 32 underneath the transparent display 28. Therefore, the user is unaware of the mobile application 10 running in the foreground. Next, one or more trigger events can be configured and used to trigger the mobile application 10 to begin capturing images or recording a video using a camera of the mobile computing device 12. In one embodiment, the user's interaction with the touch screen 26 (which may be intended as input to the background application 32) can trigger the mobile application 10 to capture images/video, without any sound or visual indication of capturing of the image/video. The mobile application 10 then releases the camera and concludes its processes. The background application 32 now becomes foreground application. The user assumes his first input was not received by the mobile computing device 12 and repeats his interaction, at which point, the now-foreground application 32 responds as expected.

A Camera Application with Transparent Overlay and Small Preview Window

Figure 1C:
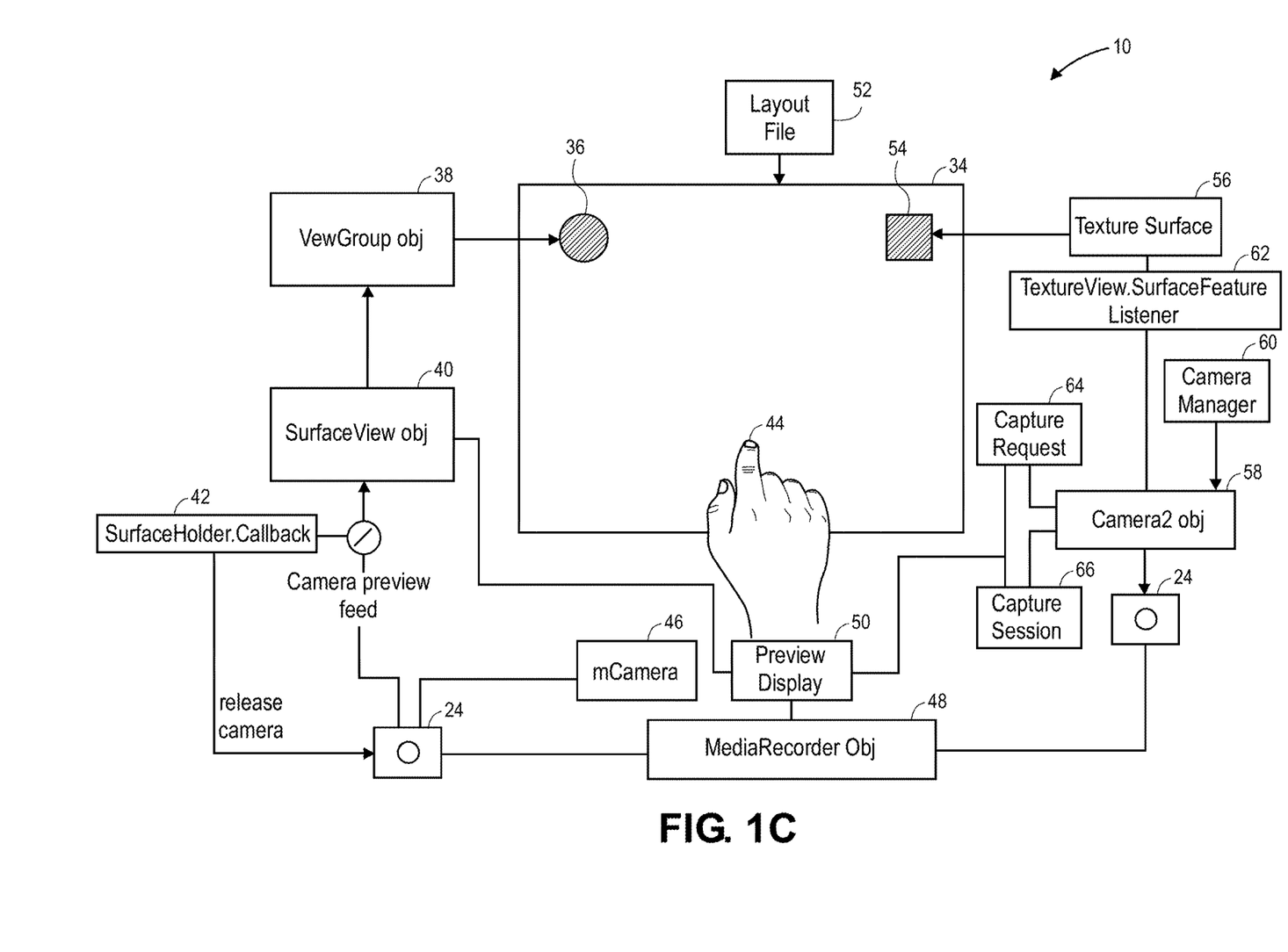
FIG. 1C illustrates example components and operations of the mobile application of the embodiment of FIG. 1.

FIG. 1C illustrates example components and operations of the mobile application 10 according to an embodiment. The mobile application 10 can be built as a set of program instructions that can run on the mobile computing device 12 and provide security and/or monitoring, using the front facing camera 24 or a rear facing camera of the mobile computing device 12. For brevity of description, the embodiments will be described to use one or more front facing cameras 24, but persons of ordinary skill in the art can appreciate that the described embodiments can also be used to capture images and/or video using one or more rear-facing cameras. The mobile application 10 can include and/or can execute software, programs, subroutines, classes, objects and/or variables associated with the camera functionality of the mobile computing device 12 to carry out its operations.

In one embodiment, the mobile application 10 can include a transparent Activity 34 with a small (invisible to human eye) preview surface 36. In Android devices, the preview surface 36 can be implemented via a ViewGroup object 38 (e.g., Linear Layout, FrameLayout, ConstraintLayout, etc.). The size of the preview surface 36 can be chosen to be small enough to be undetected by human eye. Examples of dimensions of the preview surface 36 can include a small square of 1×1 or 2×2 pixels wide or a small, thin rectangle having dimensions of 1 or 2 pixels in width and having a height of the touch screen 26 or a circle of 1 or 2 pixels wide in diameter, or any other preview surface shape and dimension that is undetectable by human eye, when rendered on the touch screen 26.

In Android devices, an Activity is a code that supports a screen or user interface (UI) and its underlying processes. Android Activities are pre-defined classes, and applications can inherit them in order to create and present their UI elements to the user of the Android device. One Android Activity is a preview class, which can provide a stream of preview images from the camera 24 to be displayed on the touch screen 26. In Android devices, an example preview class is SurfaceView object 40 which can display the preview images coming from the camera 24 of the mobile computing device 12.

In one embodiment, the transparent Activity 34 associated with the mobile application 10 includes a SurfaceView object 40, for example, "Android.view.surfaceView." The SurfaceView object 40 can receive an image preview feed from the camera 24 of the mobile computing device 12. SurfaceHolder.Callback 42 can be implemented to override the methods of SurfaceView objects 40 to control the receiving of the camera preview images. In Android ecosystem, SurfaceHolder.Callback may be implemented to receive information about changes to a surface. SurfaceHolder.Callback 42 can be used to start/stop the preview images from the camera 24, as well as to release the camera 24 for other applications within the mobile computing device 12. A field inside SurfaceHolder class can be used to maintain state as well as set the mobile application 10 as the responder to callbacks, while the mobile application 10 is running.

The SurfaceView object 40 can be added to the preview surface 36 (as for example, implemented by a preview class Activity), feeding camera preview images to the preview surface 36. In one embodiment, upon receiving a touch event 44, by the transparent Activity 34 or one of its views on the touch screen 26, mCamera 46 can be called to take one or more images (e.g., via takePicture subroutine). For taking video recordings, the ViewGroup object 38 and SurfaceView object 40 that are used to maintain the camera state can also be used to accomplish recoding of video. After the SurfaceView object 40 is added to the transparent Activity 34 (or a layout file therein) and the surfaceCreated of transparent Activity 34 is called, the Android.Media.MediaRecorder object 48 is set up and configures its previewDisplay 50 to the SurfaceView object 40.

The described systems and methods satisfy a requirement in some Android operating systems that when an Activity uses the camera 24, the Activity must be in the foreground and display a camera preview feed. This and similar requirements of some operating systems can compromise the undetected use and operations of the mobile application 10. To meet these types of operating system (OS) requirements, while keeping the mobile application 10 undetected, the mobile application 10 can be made invisible by use of transparent UI elements. Some operating systems also do not allow a camera preview window, such as preview surface 36, rendered in transparent styles. Nonetheless, as described above, the dimensions of the preview surface 36 can be chosen to render a camera preview window on the touch screen 26, small enough to be imperceptible to the user.

To make the remainder of the transparent Activity 34 invisible, an overlay Activity can be used where all Activity styles are rendered transparent. This allows the user to see a previously running background application, underneath the transparent Activity 34, and perceive that background application as the currently running foreground application. The transparent Activity 34 can remain on top, with a preview surface 36 undetectable by human eye. When the user attempts to interact with the background application, the user's interaction can be received and used as a trigger to capture one or more images and/or start video recording. When the recording of images and/or video are concluded, the transparent Activity 34 can be closed (call Finish). When the application running in the background does not responds to user's input, the user assumes the input was not received and repeats the interaction. At that time, the background application has become foreground application and responds to the user interaction as expected.

Methods of Building a Security Camera

Figure 2:
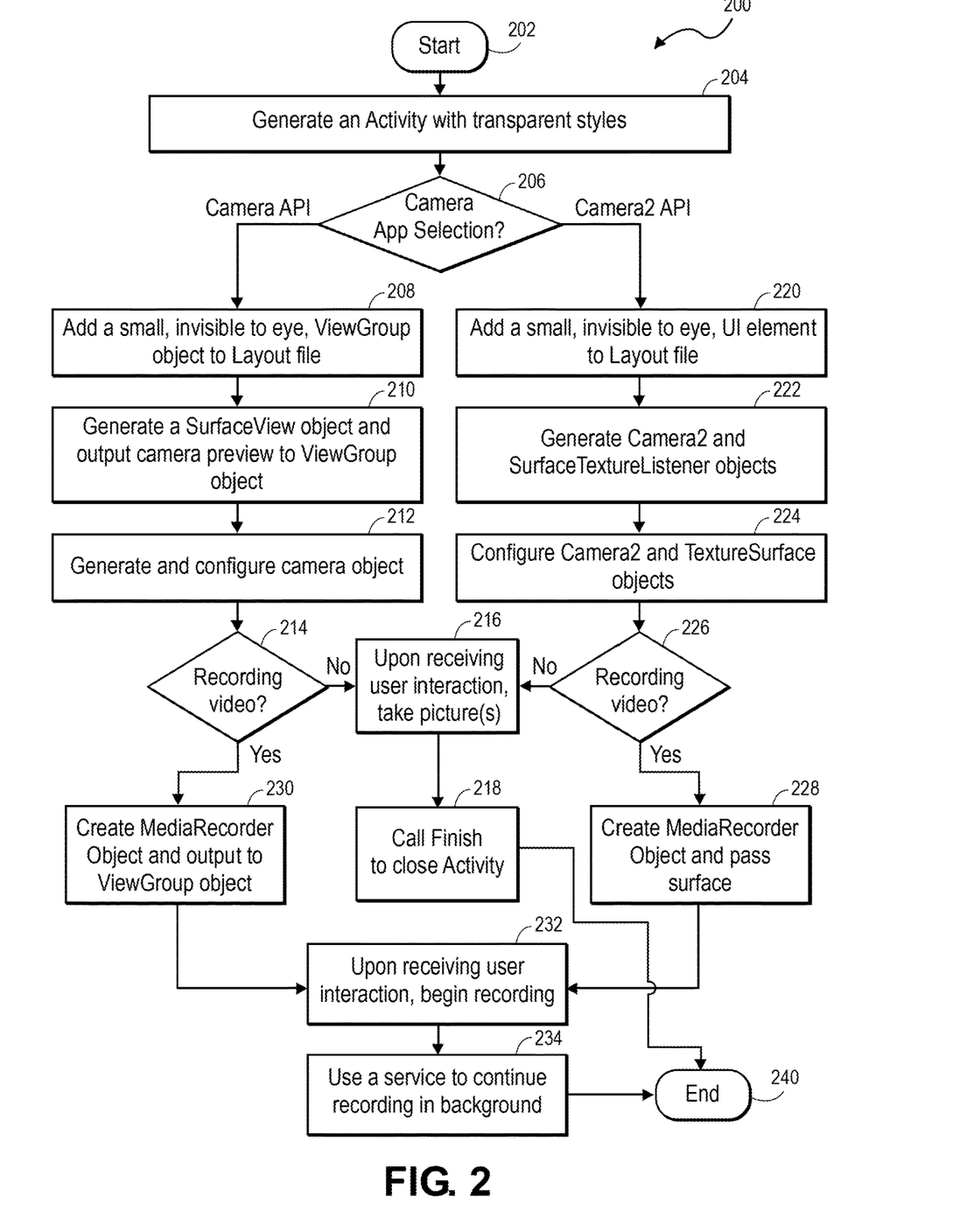
FIG. 2 illustrates a flow chart of a method of implementing a security camera according to an embodiment.

FIG. 2 illustrates a flow chart of a method 200 of implementing a security camera according to an embodiment. The method can be used as part of building the mobile application 10, or in its execution. The method 200 will be described in relation to the preceding figures. The method starts at the step 202. The method continues to the step 204 by generating a transparent Activity 34 by modifying a Style File of the transparent Activity 34 to make its display and appearance transparent, and thereby making the display and appearance of the mobile application 10 transparent, as perceived by a user. The transparent Activity 34 can include program instructions for generating one or more user interface elements on the touch screen 26 of the computing device 12.

Thus, the applications running in the background of the transparent Activity 34 appear to be running in foreground, as the transparent style of the transparent Activity 34 makes it invisible. The transparent Activity does not obstruct or interfere with other applications running in its background and is invisible. Example code to configure transparently styled Activity include the following settings in the Styles File:

```
<style name="SampleTranslucentStyle" parent="Theme.AppCompat.NoActionBar">
    <item name="android:windowBackground">@android:color/transparent</item>
    <item name="android:windowIsTranslucent">true</item>
</style>
```

The transparent Activity 34 can further include a layout file 52 (e.g., in XML format) that holds display information or data that the OS uses to render the appearance and display of the transparent Activity 34. In some embodiments, the UI elements of the transparent Activity 34 can be included in a separate layout file (e.g., in the ViewGroup object 38 which can hold UI elements such as buttons, images, text). These and other UI elements can be rendered transparent or can be configured not to output their display elements in the transparent Activity 34.

Next, the method continues to the step 206, where a camera application, capable of providing a live stream from the one or more cameras (e.g., the front-facing camera 24) is selected. If Camera API is selected, the method moves to the step 208 where a small, invisible to human eye preview surface 36 is implemented using a ViewGroup object 38 (e.g., LinearLayout, FrameLayout, ConstraintLayout, etc.). The preview surface 36 can be any surface that is invisible to human eye. Examples include a square (of dimensions 2×2 pixels), or a rectangle (dimensions 1 or 2 pixels in width by the height or width of the touch screen 26). The preview surface 36 can be generated as a container to receive preview images from the front-facing camera 24 and/or rear-facing camera of the mobile computing device 12.

Next, the method moves to the step 210 where a preview class is generated to receive preview images from the camera and output the preview images to the preview surface 36 generated in the step 208. The preview class can be used with a SurfaceView object 40 and can additionally be implemented with SurfaceHolder.Callback 42 for managing surface preview states. SurfaceHolder.Callback 42 can be used to manage the state of the preview surface 36, as well as start/stop, resume/pause state of the preview surface 36 as the mobile computing device 12 changes states.

Next, the method moves to the step 212 where a camera object is generated and configured. Configuration can include adjusting settings such as choosing an identifier of the camera (e.g., based on whether front or rear-facing cameras 24 are used), output file location (e.g., where to save captured images) and/or picture quality, and other configurations as the camera hardware may allow.

Next, the method moves to the step 214, where it is determined whether images or video should be captured. If images are to be captured, the method moves to the step 216, where upon receiving a user interaction with a user interface of the mobile computing device 12, or another trigger event, one or more pictures are taken. The method then moves to the step 218 and calls Finish to the Activity, which can entail clearing the transparent UI elements and other processes of the transparent Activity 34 from the random-access-memory (RAM) of the mobile computing device 12 or moving the transparent Activity 34 to background operations. The method ends at the step 240.

In one embodiment, the user interface with which the user attempts interaction is a UI of an application underneath the transparent Activity 34. Thus, the user interaction is received and used to trigger capturing one or more images. Subsequently, the transparent Activity 34 is closed (Finished) and the background application, with which the user intended to interact, becomes a foreground/top Activity. The user might assume that the computing device 12 did not receive his first input and attempt the input again. The second input will be received by the (previously background and now foreground) Activity/application and acted upon, making the capture of images undetected by the user.

Images can be captured by overriding or calling the onTouchEvent(MotionEvent event) of the Activity and/or by calling the camera, e.g., takePictures via Camera. ShutterCallback shutter, Camera.PictureCallback raw, and Camera.PictureCallback jpeg methods. Capturing images can also be triggered when any user interaction with the touch screen 26 is detected. Executing the method 200 returns a photo/video, which can be locally/remotely stored, sent or otherwise processed depending on the desired implementation. Once Finish is called on the transparent Activity, the user can continue interacting with the application or Activity that was previously underneath the transparent activity 34.

If in step 206, Camera2 API is selected, the method moves to the step 220, where a small UI element 54, invisible to human eye, having a TextureSurface 56 is added to the layout file 52 of the transparent Activity 34. An example of TextureSurface includes TextureView. The UI element 54 is invisible to human eye and can be similar in size to the surface preview 36 described above. Examples include a square (dimensions 2×2 pixels), or a rectangle (dimensions 1 or 2 pixels in width by the height or width of the touch screen 26).

Next, the method moves to the step 222, where a Camera2 object 58 is generated. CameraManger 60 from system service can be used with the following line of code:

(CameraManager) getSystemService(Context.CAMERA_SERVICE)

Additionally, a TextureView.SurfaceTextureListener object 62 and its methods are implemented. These methods can be used to maintain TextureSurface 56 state during the lifecycle of the transparent Activity 34. Alternatively, the same can be accomplished with CameraDevice.StateCallback interface to handle the Camera2 state.

Next, the method moves to the step 224, where Camera2 and TextureSurface objects are configured. For example, CaptureRequest 64 and CaptureSession 66 are configured with desirable attributes. These can include configurations, such as which camera to use (e.g., an identifier of the camera to be used), which lens to use, which processing pipeline to use, image quality, saving location and other configurations as the camera hardware may allow.

Next the method moves to the step 226, where it is determined whether images or video are to be captured. If images are to be taken, the method moves to the step 216 and perform operations as described above.

Video Recording

For recording videos, the camera and surfaces can be appropriately configured depending on whether Camera API or Camera2 API are chosen at the step 206. If in the step 214, it is determined that video is to be captured, the method 200 moves to the step 230 where a MediaRecorder object is created and its feed is outputted to the preview surface 36. The process then moves to the step 232, where upon receiving user interaction with the touch screen 26 of the mobile computing device 12, video is recorded. In some embodiments, the method can move to the step 234 where a service is used to continue recording in the background. Upon receiving a second trigger or after a predetermined amount of time recording can stop and the method 200 can end at the step 240.

If at the step 226, it is determined that video is to be recorded, the method moves to the step 228, where a MediaRecorder object is created and its previewDisplay 50 is added to the list of surfaces to be passed to CaptureSession 66 and CaptureRequest objects 64. The method then moves to the step 232, where upon receiving an interaction of the user, recording of the video begins. If Camera2 API is used, MediaRecorder's previewDisplay 50 surface is added to the list of surfaces that are passed to CaptureSession 66 and CaptureRequest 64 objects. The process then moves to the step 232, where upon receiving user interaction with the touch screen 26 of the mobile computing device 12, video is recorded. In some embodiments, the method can move to the step 234 where a service is used to continue recording in the background. Upon receiving a second trigger or after a predetermined amount of time recording can stop and the method 200 can end at the step 240.

Triggers to Launch Activity

Figure 3A:
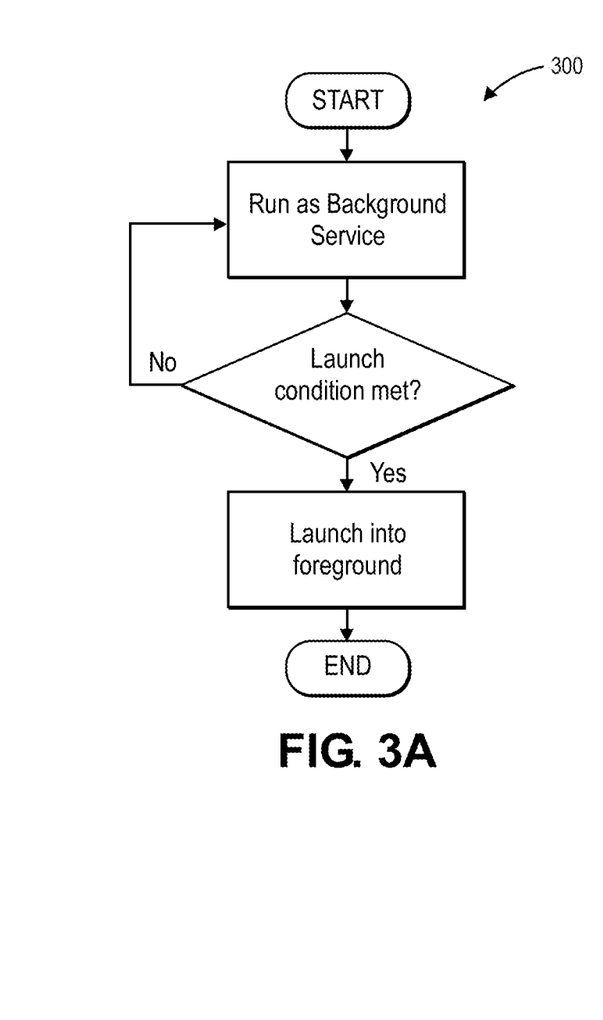
FIGS. 3A-3D illustrate triggers and trigger events and techniques that can be used with the described embodiments.

The mobile application 10 stored on the mobile computing device 12 can include instructions and/or software code implementing the method 200, its variations and alternatives and/or other embodiments described herein. The transparent Activity 34 of the mobile application 10 and the method 200 can be triggered in various ways. FIGS. 3A-D illustrate triggers and trigger events and techniques that can be used to launch the transparent Activity 34 of the mobile application 10 and/or the method 200. One or more steps of the method 200 can be pre-executed when the transparent Activity 34 is running in the background to speed up the execution of the transparent Activity 34. Alternatively, the method 200 can be executed after the transparent Activity 34 is launched into the foreground. FIG. 3A illustrates a method 300, where the mobile application 10 and its transparent Activity 34 can run in the background with a service, if a predetermined condition is met, the transparent Activity 34 can launch into the foreground. The predetermined condition can be configured based on the usage and application context of the mobile application 10. For example, the predetermined condition can be based on the location of the mobile computing device 12 or based on time or date parameters. The predetermined launch condition can be based on periodic events, for example, to trigger capturing images or video every hour or every few hours, or during business hours at predetermined intervals.

Figure 3B:
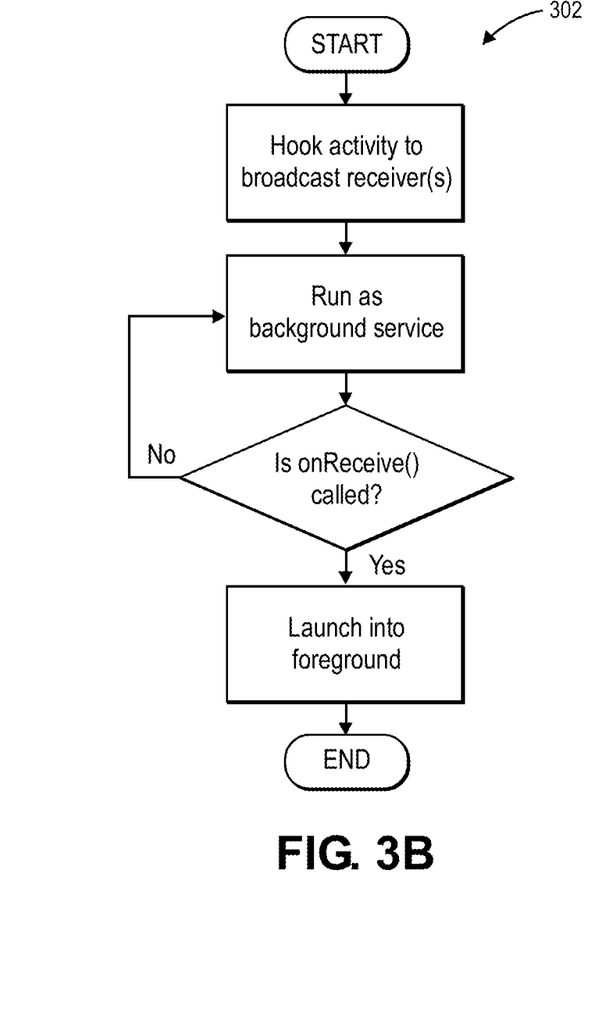

FIG. 3B illustrates a method 302, where the transparent Activity 34 can be connected to one or more broadcast receivers of the OS of the mobile computing device 12. The transparent Activity 34 can run as a background application and launch into foreground when the onReceive( ) method of the one or more broadcast receivers is called.

Figure 3C:
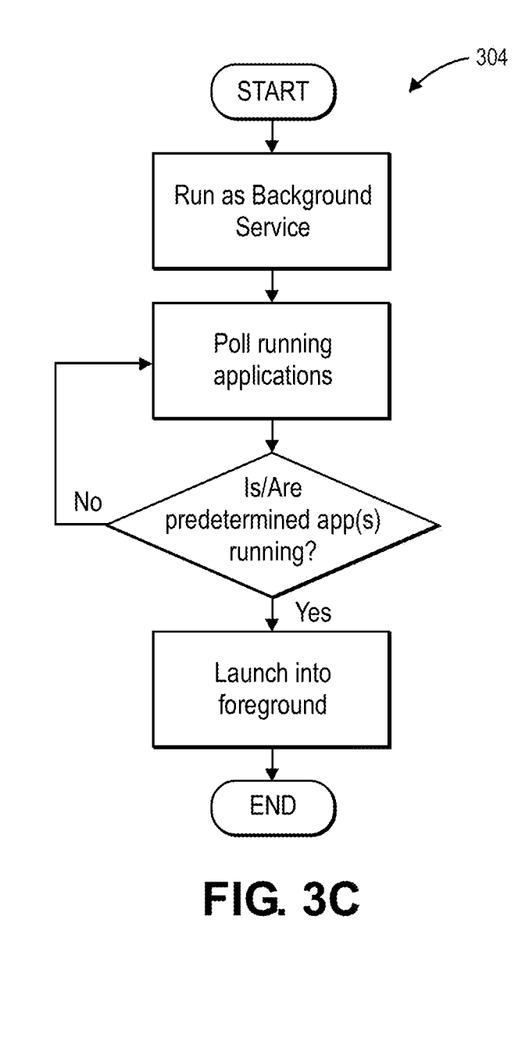

FIG. 3C illustrates a method 304, where the transparent Activity 34 can be launched by monitoring running applications (background and/or foreground). For example, the transparent Activity 34 or another service can be configured to poll the running applications (background or foreground) from various sources, such as background logs, Package- Manager, UsageStatsManager and/or ActivityManager. These sources can be periodically polled/monitored to determine which applications are running or are active and/or on top. When one or more predetermined applications are detected, the transparent Activity 34 can be launched.

Figure 3D:
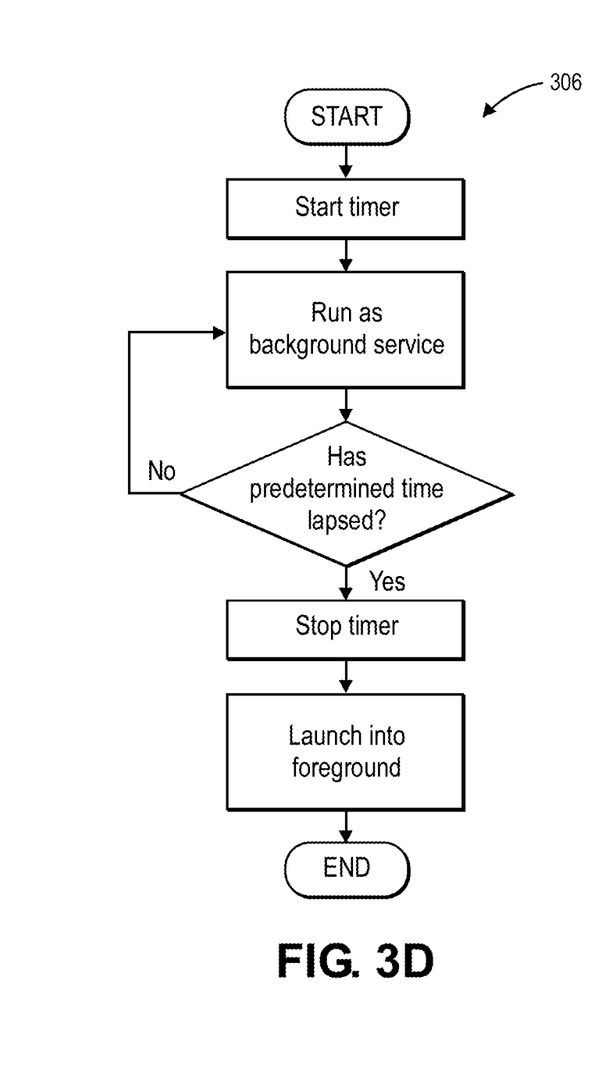

FIG. 3D illustrates a method 306, where an alarm application can be used to trigger launching the transparent Activity 34 into the foreground. In one embodiment, AlarmManager in combination with UI elements can be used to trigger the launch of the Activity. AlarmManager can be used to delay launching of the transparent Activity 34 while the administrator user switches from the transparent Activity 34 to another application to force the transparent Activity 34 into the background until an alarm condition is met. After a predetermined elapsed time, measured by the AlarmManager, the transparent Activity 34 is launched and images or videos of a second user are captured. In one embodiment, the transparent Activity 34 can start a timer, and switch itself to background operations or be forced into background operations by an administrator user. The lapsed time of the timer can be monitored. After a predetermined time has lapsed, the timer can be stopped, and transparent Activity 34 can launch into foreground operations.

The trigger events described above can also be used at steps 216 and 232 in method 200 to trigger capturing images and/or video. For example, instead of or in addition to receiving a user interaction to trigger capturing of images/video, one or more steps of the methods 300-306 can be used to trigger capturing of images/video. For example, image capture and/or video recording can occur at a predetermined time after launch of mobile application 10, or it can occur when a predetermined condition is met or an onReceive( ) method of a connected broadcast receiver is called, or a predetermined application is detected to be running.

Alternatives

When small camera previews within a transparent Activity is blocked, for example, by the operating system (OS) of the mobile computing device 12, an alternative method can be implemented. A screen shot of the current screen can be taken and set as background of the transparent Activity 34. The small camera preview can be on top or below this background of the transparent Activity 34. In this scenario, the screenshot can be taken from a transparent overlay Activity but the security camera Activity, the transparent Activity 34, can be a regular Activity that happens to have the screenshot as its background, thereby creating an illusion the transparent Activity 34 is invisible.

Additional Features

In addition to recording images and video, the mobile application 10 can be configured to record screen shots captured at the same time as the captured images and videos. Information can be gained about the reaction of a user while interacting with other applications. Captured photos, videos, screen shots and/or other information can be stored in a cloud storage, emailed to an administrator user or stored locally on the mobile computing device 12.

Use Cases

The techniques described herein along with artificial intelligence (AI) techniques can be used for facial recognition/authentication for the purpose of providing security or authentication for the mobile computing device 12. In one embodiment, facial images obtained using the described systems and techniques in combination with facial recognition technology can be used to grant/deny access to the mobile computing device 12, without a sign-in prompt. In one embodiment, the mobile application 10 can be configured to use facial recognition technology to record photos/videos of a user, if the user is determined not to be the owner/administrator of the mobile computing device 12. Such use cases can facilitate determining and documenting unauthorized uses of the mobile computing device 12. In other words, facial recognition techniques can be used as trigger events to launch the transparent Activity 34 into the foreground and/or to capture images/video of the user of the mobile computing device 12.

In another embodiment, the contemporaneous storage of photos/video and screen shots of the device and/or other information/data on contemporaneously running applications can be used in psychology experiments, marketing, product/software application development, testing and/or any other application where recording and understanding user reaction to what they see on screen is desirable. In another embodiment, the disclosed systems and methods can be used by an employer or government agency to monitor, detect and/or record usages of their devices by authorized or unauthorized users.

Figure 4A:
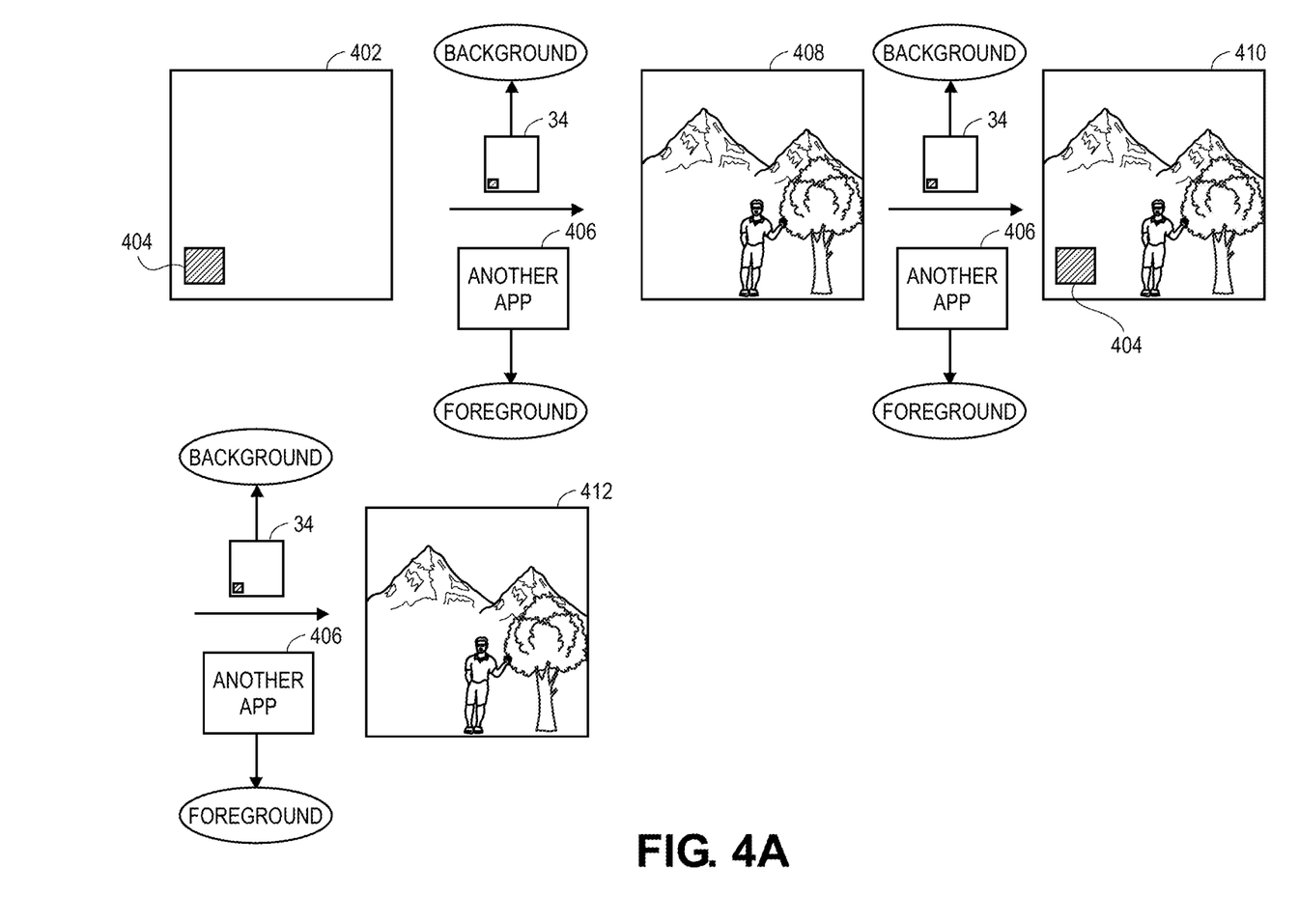
FIGS. 4A and 4B illustrate example applications of the described systems and methods according to some embodiments.
Figure 4B:
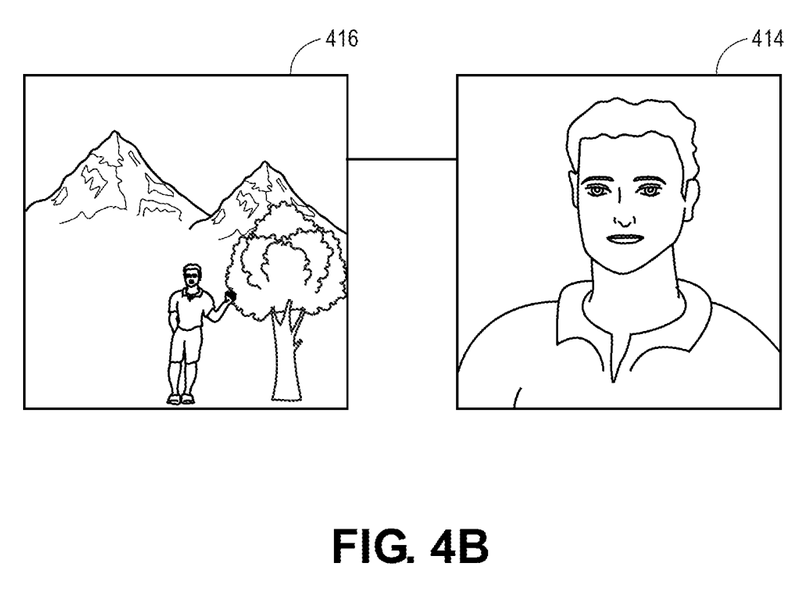

FIGS. 4A and 4B illustrate example applications of the described systems and methods according to some embodiments. FIG. 4A illustrates various screens the user can observe during the operation of the mobile application 10. Screen 402 shows the transparent Activity 34 as initially launched. The preview surface 404 is similar to the preview surface 36 or UI element 54, as described above and is a preview surface that can accept camera preview images to satisfy the OS requirement of displaying a preview window when operating the camera. The preview surface 404 is enlarged for illustration purposes, and when implemented, it is chosen of size and dimensions to be invisible to the naked human eye. Next, the transparent Activity 34 is moved to the background and its launch into foreground is delayed or is controlled based on any of the described techniques. For example, the transparent Activity 34 can launch into foreground based on input from AlarmManager, based on monitoring running applications or based on input from broadcast receivers.

Next, the user can be interacting with any other applications or home screen 406 on the mobile computing device 12. Screen 408 shows the user interacting with a photo viewing app. Next, the transparent Activity 34 can launch into the foreground when its predetermined launch condition(s) has/have been satisfied and the application 406 moves into the background. In screen 410, the transparent Activity 34 is a foreground application. The preview surface 404 is enlarged for illustration purposes, but it is imperceptible to the user. The user assumes he is still interacting with the photo application. Next, the transparent Activity 34 captures images/videos after receiving input/interactions from the user or based on some other trigger event and closes its operations or moves itself to the background. The application 406 moves back into the foreground. The user input received during the period where the transparent Activity 34 is in the foreground does not cause a response in the application 406 (e.g., the photo application). The user assumes the mobile computing device 12 did not register or receive the user's input and attempts the input again. When the transparent Activity 34 is in the background or is closed, the application 406 (e.g., the photo application) has moved into the foreground, can receive the user's subsequent inputs and can respond as expected.

The application 406 can be any application or the home screen of the mobile computing device 12. For example, application 406 can be a video playback, a game application, a productivity software, an email application, or any other application that may run on the mobile computing device 12.

FIG. 4B illustrates an embodiment, where the image/video 414 of the user is saved along with a screen shot 416 of the application 406 with which the user was interacting. The linked screen shot, and user's facial image/video data can have numerous applications, in providing security-related data, data for psychological experiments, marketing and other applications.

Some conventional techniques use a small preview window (invisible to human eye), but do not run as a foreground application, over other applications, and are therefore detectable by the user. The disclosed systems and methods on the other hand, allow the mobile application 10 to run as a foreground application, over another application and still be undetectable.

Environment

Figure 5:
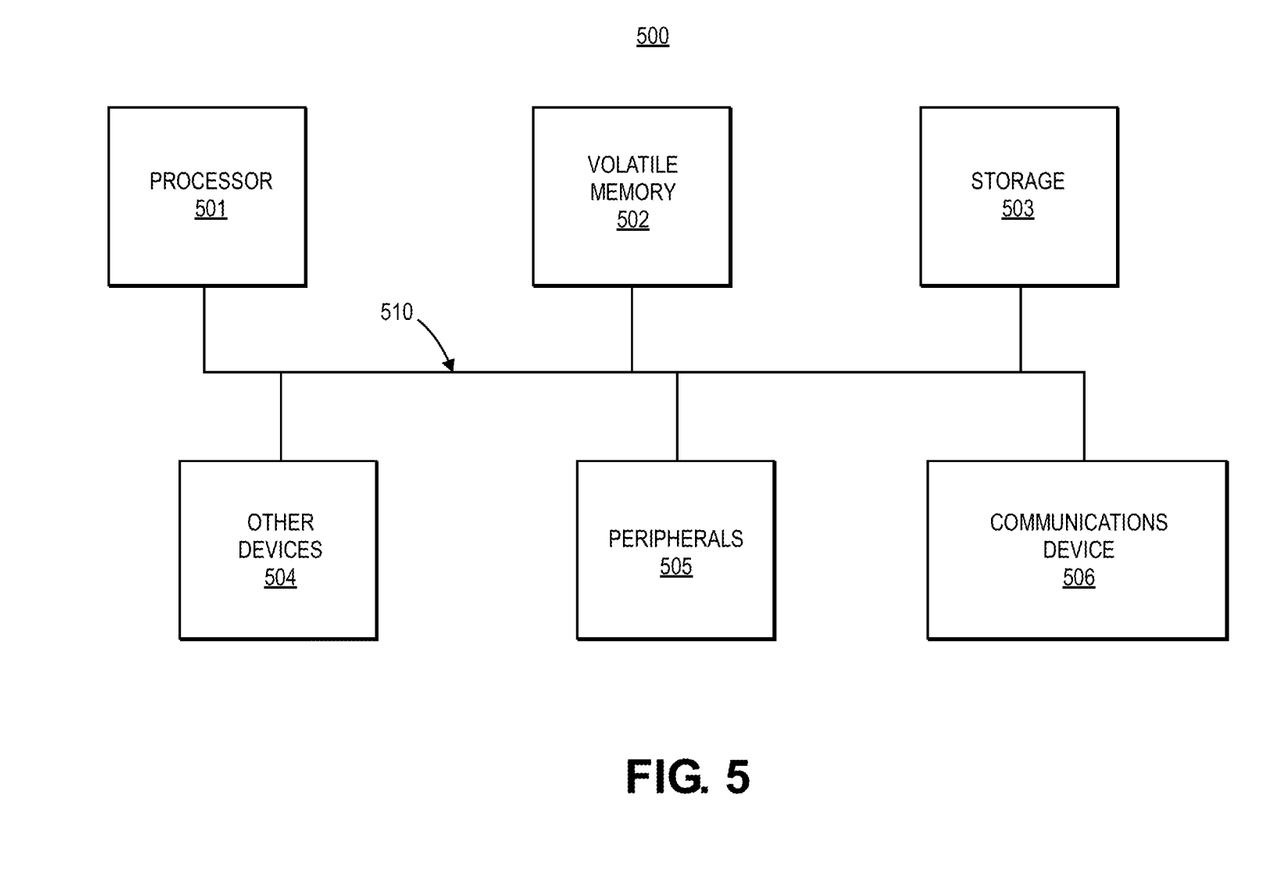
FIG. 5 is a diagram illustrating an example computer that may perform processing in some embodiments.

FIG. 5 illustrates one environment in which some embodiments may operate. Exemplary computer 500 may perform operations consistent with some embodiments. The architecture of computer 500 is provided as an example. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. Random Access Memory (RAM) is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, touch-sensitive screen and other input devices. Peripherals 505 may also include output devices such as a display.

Peripherals 505 may include removable media devices such as CD-R and DVD-R recorders/players. Communications device 506 may connect the computer 500 to an external medium. For example, communications device 506 may take the form of a network adapter that provides communications to a network. The computer 500 may also include a variety of other devices 504. The various components of the computer 500 may be connected by a connection medium 510 such as a bus, crossbar, or network.

What is claimed is:

1. A method of capturing media using a camera in a computing device, comprising:
periodically polling running applications of the computing device;
when detecting a predetermined application running on the computing device, performing operations comprising:
generating an Activity, wherein the Activity comprises one or more user interface elements, and wherein the Activity further comprises a layout file and the layout file generates a display of the user interface elements on a screen of the computing device;
modifying styles in the layout file, such that the user interface elements are generated transparent on the screen, such that user interface elements of a background Activity are visible to a user of the computing device, presenting the background Activity as a foreground Activity, while the generated Activity is the foreground Activity;
requesting access to the camera of the computing device and a preview image feed from the camera, wherein the preview image feed comprises preview images from the camera;
generating a preview class comprising the preview images from the camera;
generating a preview surface small enough in dimension to be invisible to human eye;
outputting the preview images to the preview surface;
incorporating the preview surface in the layout file, wherein the preview surface generates the preview images from the camera on the screen;
generating a camera object;
receiving a first trigger event, comprising the user input directed to the background Activity; and
based on parameters of the camera object, capturing one or more images or a video segment, in response to the first trigger event.

2. The method of claim 1, further comprising: terminating the Activity after the image and/or the video segment are captured or moving the Activity to background.

3. The method of claim 1 further comprising: configuring the camera object settings, including one or more of an identifier of the camera, image and/or video quality, and a storage location for captured image and/or video.

4. The method of claim 1, wherein the screen comprises a touch screen and wherein the first trigger event comprises receiving an input comprising a user touching the touch screen.

5. The method of claim 1, wherein the layout file is in XML format.

6. The method of claim 1, wherein the preview surface comprises a square, a rectangle or circle.

7. The method of claim 1, wherein the camera object is generated using Camera API and the preview class comprises a SurfaceView object and implements Surfac eHol der. Callback.

8. The method of claim 1, wherein capturing video comprises generating a MediaRecorder object.

9. The method of claim 8 further comprising using services to continue recording video in the background.

10. The method of claim 1, wherein generating the Activity is in response to one or more of: occurrence of one or more predetermined conditions, detection of one or more predetermined background Activity, receiving a trigger from a broadcast receiver, detection of a predetermined application among running applications on the computing device, receiving a user interaction with a user interface of the computing device, and receiving a signal from a timer or alarm application.

11. The method of claim 10, wherein detection of a predetermined application comprises polling one or more of background logs, PackageManager, UsageStatsManager and ActivityManager.

12. The method of claim 1, wherein the camera object is generated using Camera API and the preview class comprises a SurfaceView object.

13. The method of claim 1, wherein the camera object is generated using Camera2 API, the preview class comprises a TextureSurface object, and the preview surface comprises a UI element.

14. The method of claim 1, further comprising: capturing one or more screen shots of the screen of the computing device at the same time as capturing the one or more images or video segment and storing the screen shots along with the captured images and/or video segment.

15. A Non-transitory computer storage that stores executable program instructions that, when executed by one or more computing devices, configure the one or more computing devices to perform operations comprising:
periodically polling running applications of the computing device;
when detecting a predetermined application running on the computing device, performing operations comprising:
generating an Activity, wherein the Activity comprises one or more user interface elements, and wherein the Activity further comprises a layout file and the layout file generates a display of the user interface elements on a screen of the computing device;
modifying styles in the layout file, such that the user interface elements are generated transparent on the screen, such that user interface elements of a background Activity are visible to a user of the computing device, presenting the background Activity as a foreground Activity, while the generated Activity is the foreground Activity;
requesting access to the camera of the computing device and a preview image feed from the camera, wherein the preview image feed comprises preview images from the camera;
generating a preview class comprising the preview images from the camera;
generating a preview surface small enough in dimension to be invisible to human eye;
outputting the preview images to the preview surface;
incorporating the preview surface in the layout file, wherein the preview surface generates the preview images from the camera on the screen;
generating a camera object;
receiving a first trigger event, comprising the user input directed to the background Activity; and
based on parameters of the camera object, capturing one or more images or a video segment, in response to the first trigger event.

16. The non-transitory computer storage of claim 15, wherein the operations further comprise terminating the Activity after the image and/or the video segment are captured or moving the Activity to background.

17. The non-transitory computer storage of claim 15, wherein the camera object is generated using Camera API and the preview class comprises a SurfaceView object and implements SurfaceHolder.Callback.

18. The non-transitory computer storage of claim 15, wherein capturing video comprises generating a MediaRecorder object.

19. The non-transitory computer storage of claim 15, wherein the operations further comprise using services to continue recording video in the background.

20. The non-transitory computer storage of claim 15, wherein the camera object is generated using Camera2 API, the preview class comprises a TextureSurface object, and the preview surface comprises a UI element.

* * * * *